STOVES & FURNACES,
Fireplaces.
126
120
EXAMINER.
J. Tiberi
Grate.
No. 288. A. I. Patented Jul. 17, 1860.
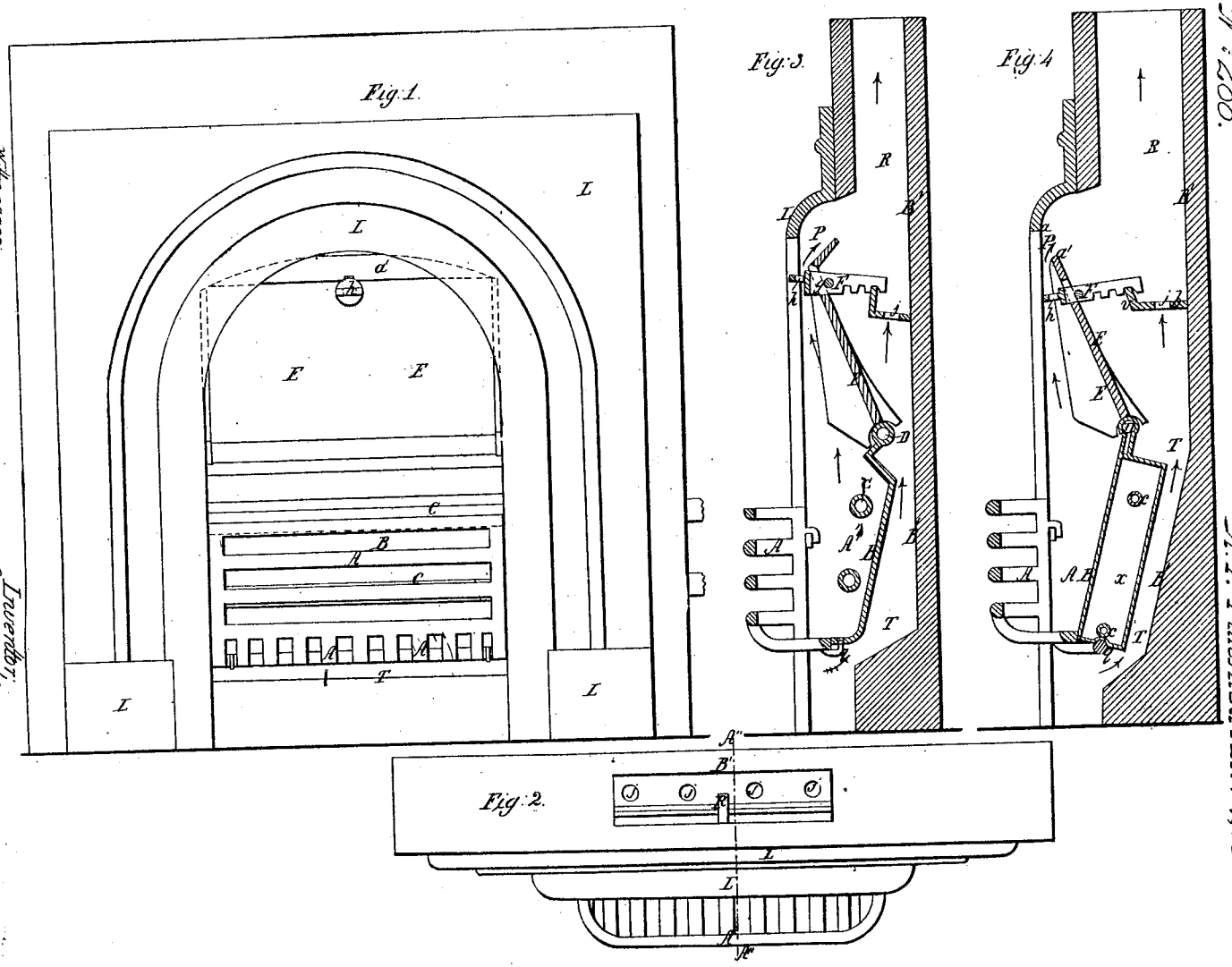
Witnesses;
Amos Benning
A. L. Gray
Inventor;
Joseph Tiberi
...iters Patent No. 25,352.—*Improvement in Grates.*—I claim the com-
... back E, with the stationary back B, when they are arranged with
...nd with the flue T behind them and under the grate, in the manner
JOSEPH TIBERI.
N. PETERS, PHOTO-LITHOGRAPHER, WASHINGTON, D. C.